(12) United States Patent  (10) Patent No.: US 6,473,268 B2
Simozato  (45) Date of Patent: *Oct. 29, 2002

(54) RECORDING DISK DRIVE (75) Inventor: Toru Simozato, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,703

(22) Filed: May 21, 1999

(65) Prior Publication Data

US 2002/0057533 A1 May 16, 2002

(30) Foreign Application Priority Data

Nov. 30, 1998 (JP) .......................................... 10-338756

(51) Int. Cl.$^7$ .......................... G11B 21/12; G11B 21/22
(52) U.S. Cl. .................... 360/254.3; 360/254.6
(58) Field of Search ........................ 360/254.3–254.6

(56) References Cited

U.S. PATENT DOCUMENTS

| 3,634,836 | A | * | 1/1972 | Huetten et al. | .......... 360/98.01 |
| 4,392,165 | A | * | 7/1983 | Wright | ......................... 360/105 |
| 4,535,374 | A | * | 8/1985 | Anderson et al. | ........... 360/103 |
| 4,571,648 | A | * | 2/1986 | Barski | ......................... 360/105 |
| 4,661,873 | A | * | 4/1987 | Schulze | ....................... 360/105 |
| 4,703,376 | A | * | 10/1987 | Edwards et al. | ............. 360/105 |
| 4,742,410 | A | * | 5/1988 | Smith | ......................... 360/105 |
| 4,829,396 | A | * | 5/1989 | Okutsu | ......................... 360/105 |
| 4,839,756 | A | * | 6/1989 | Chew et al. | ................. 360/105 |
| 4,884,261 | A | * | 11/1989 | Dalziel | ......................... 360/105 |
| 4,956,733 | A | * | 9/1990 | Dalziel | ......................... 360/105 |
| 5,057,954 | A | * | 10/1991 | O'Sullivan et al. | ......... 360/105 |
| 5,068,841 | A | * | 11/1991 | Nakayama et al. | ........... 369/13 |
| 5,274,519 | A | * | 12/1993 | Saito et al. | .................. 360/105 |
| 5,283,705 | A | * | 2/1994 | Iwabuchi | ................. 360/254.4 |
| 5,285,338 | A | * | 2/1994 | Sugahara et al. | ........... 360/105 |
| 5,463,514 | A | * | 10/1995 | Yaeger | ......................... 360/105 |
| 5,471,439 | A | * | 11/1995 | Katayama et al. | ............ 369/13 |
| 5,550,695 | A | * | 8/1996 | Matsumoto | ................. 360/105 |
| 5,831,795 | A | * | 11/1998 | Ma et al. | ..................... 360/105 |
| 6,028,745 | A | * | 2/2000 | Nguyen et al. | ............. 360/105 |
| 6,057,987 | A | * | 5/2000 | Furay et al. | ................. 360/105 |
| 6,115,214 | A | * | 9/2000 | Allsup et al. | ................ 360/105 |

FOREIGN PATENT DOCUMENTS

JP  43377  1/1992
JP  478074  3/1992

* cited by examiner

Primary Examiner—William Klimowicz
(74) Attorney, Agent, or Firm—Greer, Burns & Crain, Ltd.

(57) ABSTRACT

A suspension is cantilevered at the tip end of a carriage arm. A magnetic head is mounted on the free end of the suspension. A lift bar in parallel with the disk surface contacts the suspension from the below. The lift bar may move in the path intersecting the suspension while contacting the suspension. The lift bar thus generates the warp in the suspension. The magnetic head at the free end of the suspension may be kept away from the disk surface as a result of the warp in the suspension. The adjustment of the orientation of the lift bar prevents the suspension from twisting.

17 Claims, 8 Drawing Sheets

RECORDING DISK DRIVE

BACKGROUND OF THE INVENTION

1. Field of the Invention

The present invention relates to a recording disk drive such as a hard disk drive unit (HDD), and in particular, to a recording disk drive comprising a recording disk, a suspension cantilevered on a carriage arm to tilt in the forward direction toward a disk surface of the recording disk, and a head supported at the free end of the suspension.

2. Description of the Prior Art

A flying head has been generally known capable of writing and reading information data to and from a recording disk or magnetic disk without contacting the disk surface of the recording disk, for example, in the field of hard disk drive units (HDDs). The lift of the flying head is usually generated by air stream flowing along the disk surface during rotation of the magnetic disk. When the rotation is terminated, the flying head cannot keep flying above the disk surface. No air stream leads to the result that the flying head is urged against the disk surface under the effect of elastic restoration of the suspension. The flying head must be prevented from contacting the data tracks or area on the disk surface when the rotation of the magnetic disk has been terminated.

A contact start stop (CSS) is well known in which the flying head is urged against the non-data tracks or an area at the innermost portion of the disk surface. The CSS allows the flying head to take off from the disk surface if enough air stream has been generated on the disk surface after the magnetic disk starts to rotate. However, in this CSS, the flying head must be released from adhesion from a lubricating oil or agent spread over the disk surface when the head takes off from the disk surface. As the size of a flying head gets smaller, it becomes nearly impossible for the flying head to easily take off from the disk surface once the flying head is urged against the disk surface.

On the other hand, a ramp load proposes a utilization of the warp of the suspension supported at the tip end of the carriage arm in avoiding the contact between the flying head and the stationary disk surface. The warp may be caused by a support member disposed outside the magnetic disk. As long as the warp of the suspension is kept, the flying head at the free end of the suspension can be kept away from the disk surface. If the flying head is positioned above the data tracks or area on the disk surface with the warp kept in the suspension, the flying head cannot contact the disk surface. No adhesion from a lubricating oil or agent acts on the flying head.

The support member of the ramp load is adapted to form a ramp in the path of the suspension. When the suspension climbs up the ramp in response to the swinging movement of the carriage arm, the warp gets larger in the suspension. The larger warp makes a higher position of the flying head above the disk surface. On the other hand, the ramp causes a twist in the suspension, too. If such twist remains in the suspension, the degree of the warp is changed in the suspension. This change may lead to deterioration in controllability of attitude and/or position of the flying head when information data is read out of or written in the magnetic disk.

SUMMARY OF THE INVENTION

It is accordingly an object of the present invention to provide a suspension load mechanism contributing to prevention of a twist in a suspension supporting a head.

According to a first aspect of the present invention, there is provided a recording disk drive comprising: a recording disk; a suspension cantilevered on a carriage arm to tilt in a forward direction toward a disk surface of the recording disk; a head supported at a free end of the suspension; and a lift bar moveable along a path intersecting the suspension.

With the above-described recording disk drive, the warp in the suspension gets larger as the lift bar contacting the suspension advances in the path intersecting the suspension. As long as the warp is maintained in the suspension, the head at the free end of the suspension can be kept away from the disk surface of the recording disk. If the head is always shifted to positions above the data area with the warp kept in the suspension, the head can be prevented from contacting the disk surface. No adhesion acts on the head from a lubricating oil or agent spread over the disk surface.

The recording disk drive preferably further comprises a support member supporting the lift bar in parallel with the disk surface. If the lift bar is kept in parallel with the disk surface, it is possible to prevent the suspension from twisting by adjusting the orientation of the path of the lift bar to the tilting direction of the suspension.

The recording disk drive may further comprise a drive mechanism which generates a drive force acting on the support member to move the lift bar. In particular, the drive mechanism preferably comprises a cam formed on the carriage arm so as to cause the drive force in response to swinging movement of the carriage arm. Such advancement of the lift bar in response to the swinging movement of the carriage arm enables to eliminate a drive source to be added to the recording disk drive for driving the lift bar. However, the drive mechanism may be adapted to move the lift bar with assistance of any additional drive source without utilization to the swinging movement of the carriage arm.

The adjustment in orientation of the tilting direction of the suspension to the path of the lift bar may require an orientation adjuster causing a directional force to change an orientation of the lift bar in a plane parallel to the disk surface in response to the swinging movement of the carriage arm. For example, when the tilting direction is complied with the central line of the suspension, the suspension keeps the constant distance from the disk surface along the direction perpendicular to the central line. Accordingly, as long as the lift bar in parallel with the disk surface contacts the suspension at the line perpendicular to the central line, the constant distance from the disk surface can be maintained along the direction perpendicular to the central line in the suspension. The suspension can then be prevented from twisting.

The orientation adjuster may comprise: a first guide passage extending in a first direction along the path of the lift bar; a pivot moveable along the first guide passage so as to support the support member; a second guide passage extending in a second direction intersecting the first direction; and a guide member formed on the support member so as to move along the second guide passage in response to movement of the pivot, thereby causing swinging movement of the support member around the pivot. Such orientation adjuster enables the lift bar to follow the change in the orientation of the suspension in accordance with the swinging movement of the carriage arm.

In addition, the recording disk drive may further comprise an insertion mechanism generating a force to move the lift bar between a standby position defined outside the recording disk and an operating position defined between the suspension and the recording disk. Such insertion mechanism serves to keep the lift bar away from the recording disk while the head is operated to write or read information data. It is accordingly possible to reliably prevent the lift bar from interfering with the head, the suspension, the carriage arm, and the like.

The insertion mechanism may comprise: a support member supporting the lift bar at its tip end; a pivot supporting the support member for swinging movement; and a cam formed on the carriage arm so as to cause the swinging movement of the support member in response to swinging movement of the carriage arm. Such insertion mechanism enables the lift bar to shift between the standby and operating positions with assistance of swinging movement of the carriage arm. Such shift of the lift bar in response to the swinging movement of the carriage arm possibly eliminates a drive source to be added to the recording disk drive for driving the lift bar. However, the insertion mechanism may be adapted to move the lift bar with assistance of any additional drive source without utilization to the swinging movement of the carriage arm.

In case where the swinging movement of the carriage arm is utilized to move the lift bar between the standby and operating positions, the cam according to the insertion mechanism may also generate a drive force to cause advancement of the support member. A single drive source common to the insertion and drive mechanisms may lead to a simplified structure in the recording disk drive.

The recording disk drive may simultaneously comprise the insertion mechanism and the above-described orientation adjuster. In this case, the pivot in the insertion mechanism may be guided in the first guide passage of the orientation adjuster.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
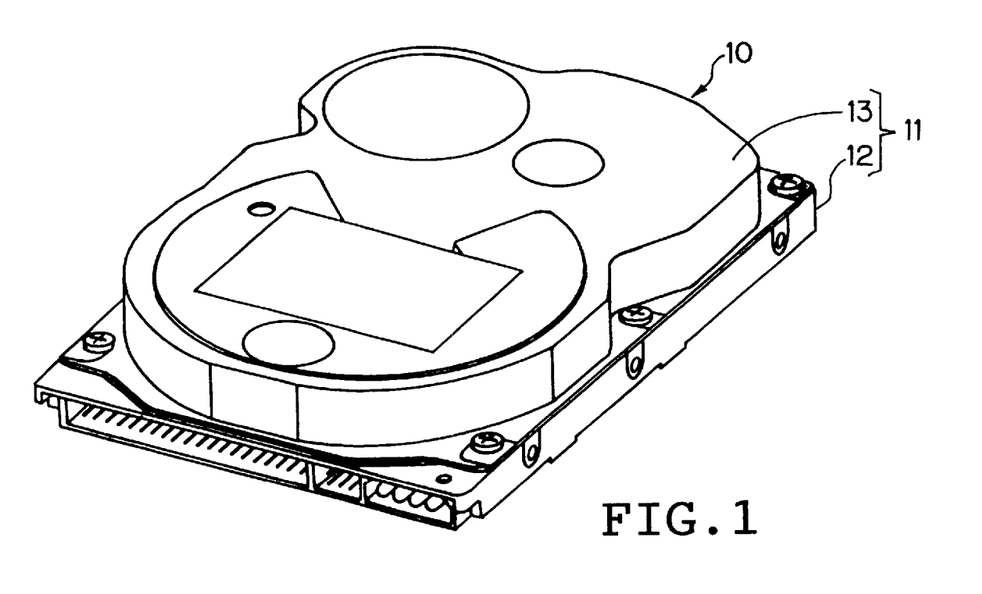
FIG. 1 illustrates a perspective view of a hard disk drive unit (HDD)

FIG. 1 illustrates a hard disk drive unit (HDD) 10 as an example of a recording disk drive. The HDD 10 comprises a housing 11 which can be divided into a box-shaped housing body 12 and a cover 13 closing the opening of the housing body 12. The HDD 10 may be assembled in a housing of a computer, or may be used as an external storage device independent of a computer.

Figure 2:
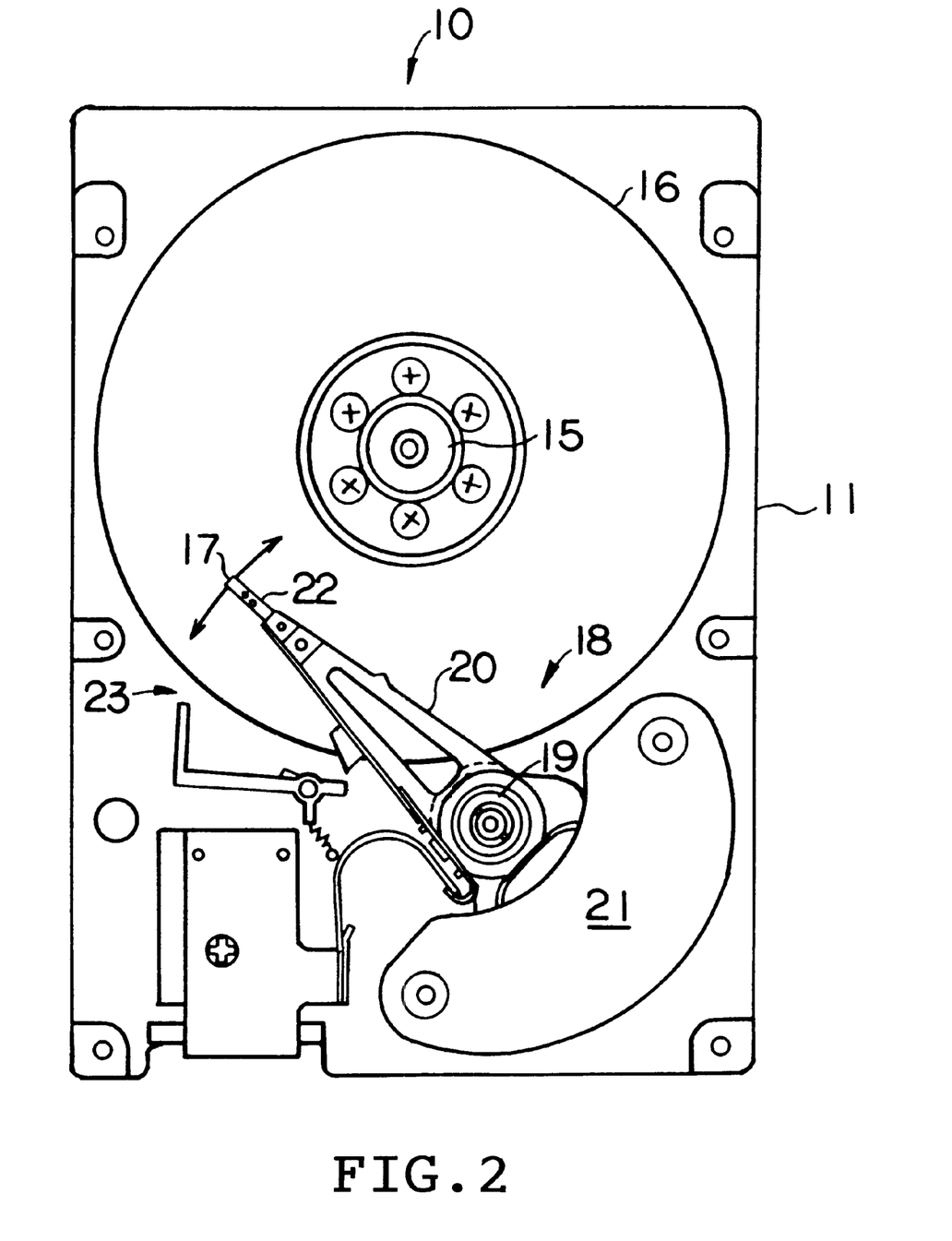
FIG. 2 is a plan view schematically illustrating the interior structure of the HDD.

As shown in FIG. 2, the housing 11 accommodates magnetic disks 16 sequentially mounted on a single spindle motor 15, and a positioning mechanism 18 capable of positioning a set of magnetic heads 17 at respective target recording tracks on the magnetic disks 16. The positioning mechanism 18 comprises carriage arms 20 capable of synchronously swinging around a common support axis 19, and an actuator 21 comprising a magnetic circuit, for example. When the actuator 21 serves to cause the carriage arms 21 to swing, the magnetic heads 17 move in the radial direction of the magnetic disks 16 along the circular path established around the support axis 19.

A suspension 22 is cantilevered at the tip end of the carriage arm 20 so as to tilt in the forward direction toward the disk surface of the magnetic disk 16. The magnetic head 17 is supported at the free or tip end of the suspension 22. If no external force acts on the suspension 22, the magnetic head 17 at the tip end of the suspension 22 is urged against the disk surface of the magnetic disk 16. When the magnetic disk 16 rotates, the magnetic head 17 receives air stream generated along the disk surface of the magnetic disk 16, so that the magnetic head 17 flies above the disk surface allowing the small warp in the suspension. Information data is read out of or written in the magnetic disk 16 when the magnetic head 17 keeps flying.

A suspension load mechanism 23 according to the present invention is disposed outside a set of the magnetic disks 16 in the vicinity of the magnetic disks 16. The suspension load mechanism 23 utilizes a warp generated in the suspension 22 at the tip end of the carriage arm 20 so as to avoid the contact between the magnetic head 17 and the stationary magnetic disk 16 when no rotation is effected on the magnetic disk 16.

Figure 3:
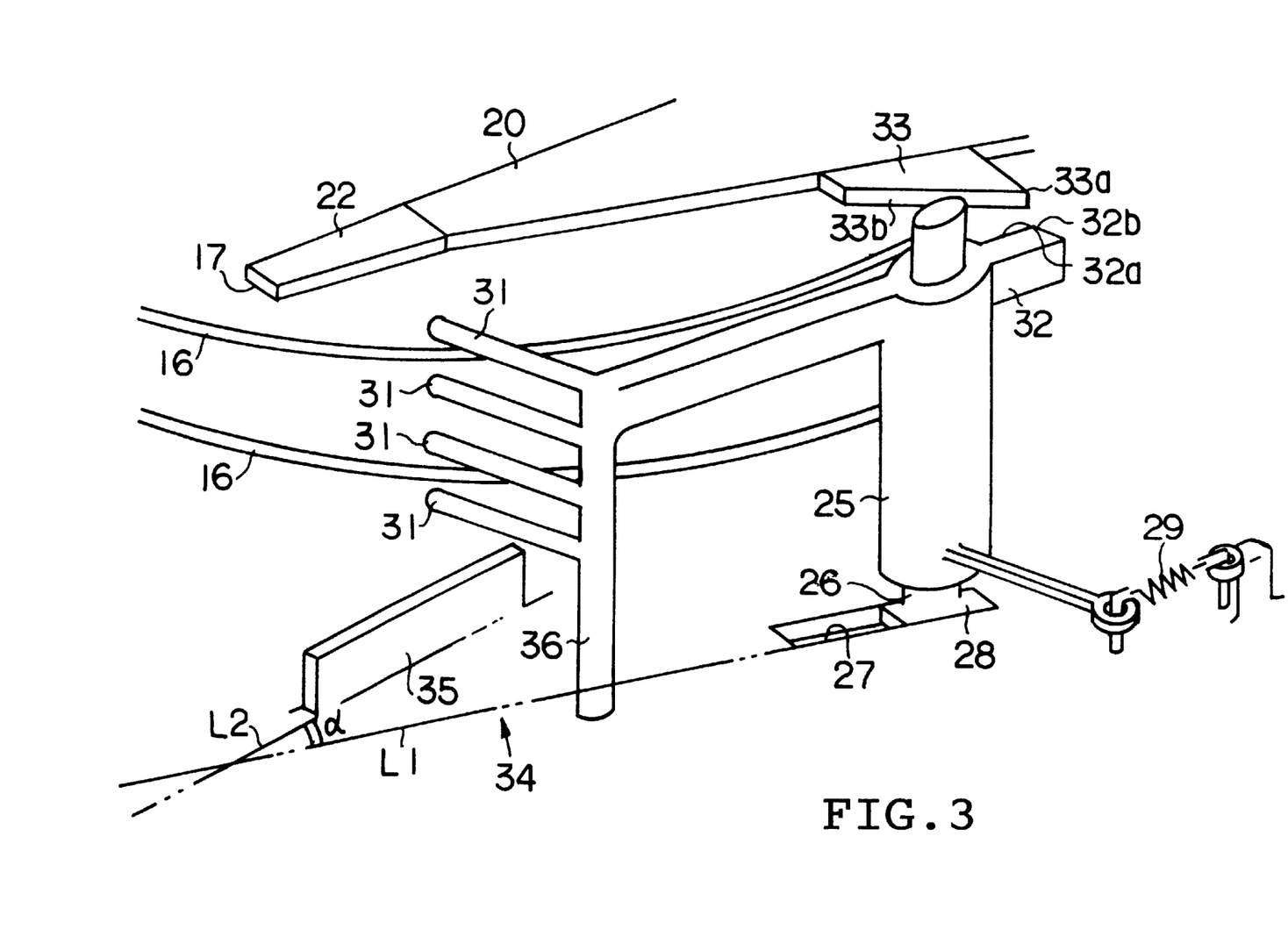
FIG. 3 is an enlarged perspective view illustrating a suspension load mechanism according to the present invention.

Referring to FIG. 3, the suspension load mechanism 23 comprises a pivot 26 supporting a support member 25 for swinging movement. A slider 28 is formed at the lower end of the pivot 26. The slider 28 is received in a guide groove 27 as a first guide passage at the bottom of the housing body 12. The pivot 26 is accordingly capable of moving forward and backward along the guide groove 27. A spring 29 is connected to the support member 25 so as to generate a spring force which urges the pivot 26 toward a standard position at an end of the guide groove 27, as shown in FIG. 3.

Lift bars 31 are integrally formed at the forward end of the support member 25. The lift bars 31 correspond to the respective magnetic heads 17 opposed to the respective disk surfaces of the magnetic disks 16. For example, if four data areas are established on both sides of a pair of magnetic disks 16, four lift bars 31 are provided corresponding to four magnetic heads 17 opposed to the respective data areas. The support member 25 keeps the lift bars 31 in parallel with the corresponding disk surfaces.

A cam receiving protrusion 32 is formed on the support member 25 so as to extend rearward from the pivot 26. The cam receiving protrusion 32 is adapted to receive a cam 33 formed on the carriage arm 20. The combination of the cam 33 and cam receiving protrusion 32 may be switched over between an insertion mechanism and a drive mechanism in response to the amount of swinging movement of the carriage arm 20. When the insertion mechanism is established, the cam 33 and cam receiving protrusion 32 in cooperation serve to generate a drive force to swing the support member 25 around the pivot 26 which is kept at the standard position in the guide groove 27 with assistance of the spring force of the spring 29. In this insertion mechanism, the carriage arm 20 is allowed to swing with an apex 33a of the cam 33 contacting the side surface 32a of the cam receiving protrusion 32. When the drive mechanism is established, the cam 33 and cam receiving protrusion 32 in cooperation serve to generate a drive force to advance the pivot 26 from the standard position along the guide groove 27 against the spring force from the spring 29. In this drive mechanism, the carriage arm 20 is adapted to swing with an apex 32b of the cam receiving protrusion 32 sliding on the cam surface 33b of the cam 33.

An orientation adjuster 34 is connected to the lift bars 31 so as to cause a directional force to change the orientation of the lift bars 31 in corresponding planes parallel to the disk surfaces of the magnetic disks 16 in response to the advancement of the pivot 26 in the guide groove 27. The orientation adjuster 34 may comprise a guide wall 35 formed at the bottom of the housing body 12 so as to extend in a second direction L2 intersecting a first direction L1 along the orientation of the guide groove 27, and a guide member 36 integrally formed at the forward end of the support member 25. The guide wall 35 serves to provide a second guide passage according to the present invention. The guide member 36 is adapted to contact the guide wall 35. According to this orientation adjuster 34, when the pivot 26 advances along the first direction L1, the guide member 36 is allowed to move in the second direction L2 intersecting the first direction L1, so that the support member 25 swings about the pivot 26 to finally change the orientation of the lift bars 31.

Figure 4:
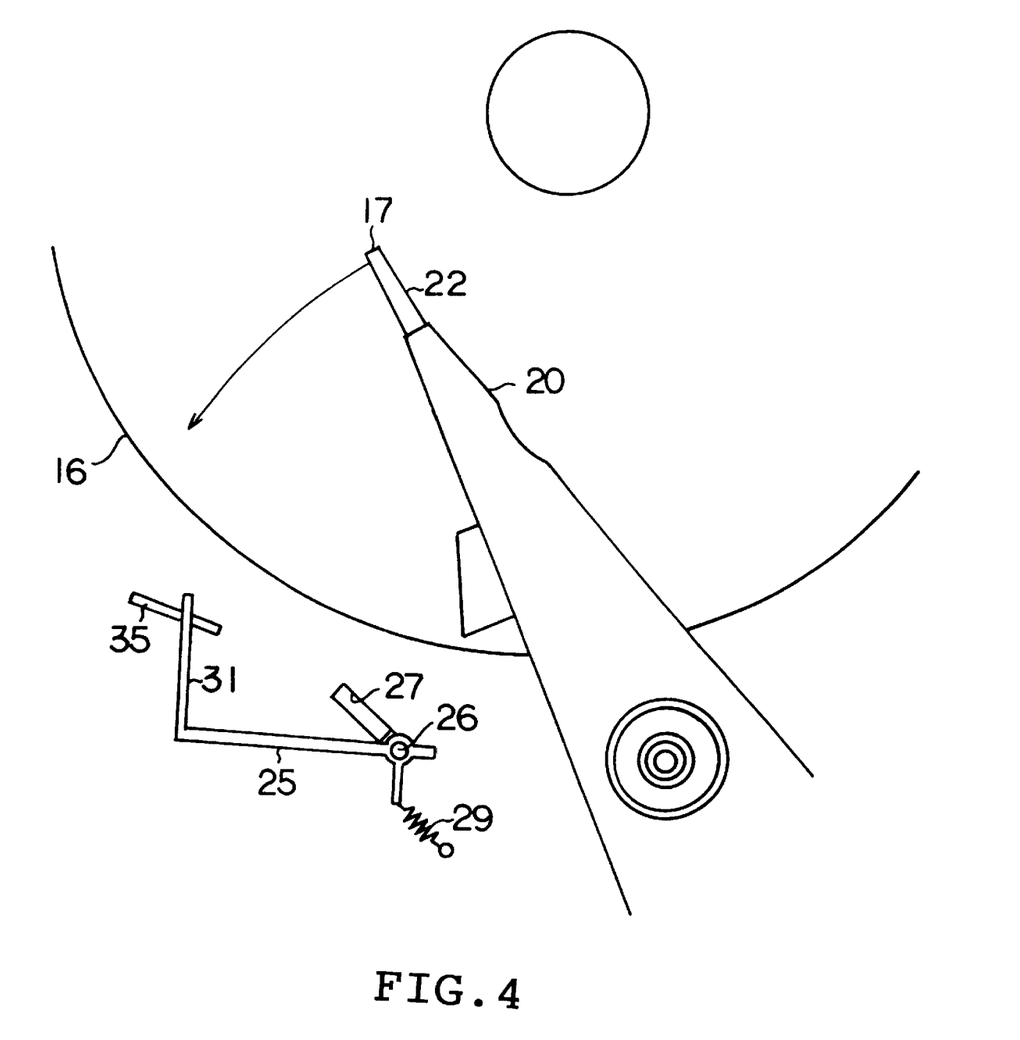
FIG. 4 is an enlarged plan view illustrating a lift bar at the standby position during rotation of the magnetic disk.

Next, the description will be made on the operation of the suspension load mechanism according to the present invention. As shown in FIG. 4, when the magnetic disks 16 rotate to allow the magnetic heads 17 to write or read information data, the support member 25 receives a spring force from the spring 29, so that the lift bars 31 are maintained at the standby position defined outside a set of the magnetic disks 16 in the vicinity of the periphery of the magnetic disks 16. The pivot 26 is pulled back to the standard position in the guide groove 27 with assistance of the spring force from the spring 29.

Figure 5:
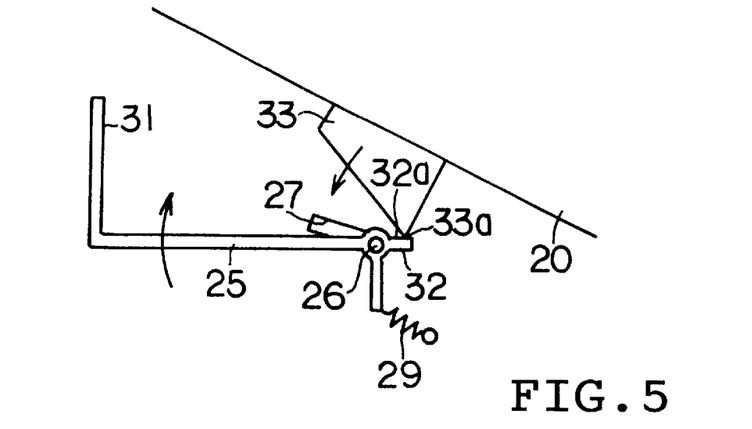
FIG. 5 is an enlarged plan view illustrating a cam contacting a cam receiving protrusion when the insertion mechanism has been established.
Figure 6:
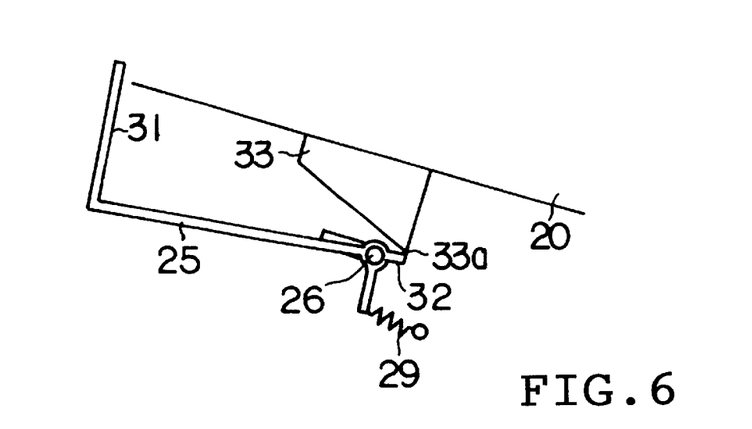
FIG. 6 is an enlarged plan view illustrating the cam contacting the cam receiving protrusion at the moment when the insertion mechanism is switched over to the drive mechanism.

When the rotation of the magnetic disks 16 is intended to be terminated after the magnetic heads 17 finish the writing or reading operation, the carriage arm 20 is operated to swing in the outward direction to bring the magnetic heads 17 off the magnetic disks 16. The apex 33a of the cam 33 then contacts the side surface 32a of the cam receiving protrusion 32 as shown in FIG. 5. The insertion mechanism has been established for the cam 33 and cam receiving protrusion 32. Continuous swinging movement of the carriage arm 20 allows the apex 33a of the cam 33 to urge the side surface 32a of the cam receiving protrusion 32, so that the support member 25 is caused to swing around the pivot 26 against the spring force from the spring 29. As a result, the lift bars 31 gradually enter the corresponding spaces between the disk surfaces of the magnetic disks 16 and the carriage arms 20. The swinging movement of the support member 25 is kept until the apex 33a of the cam 33 reaches the terminal edge of the cam receiving protrusion 32.

Figure 7:
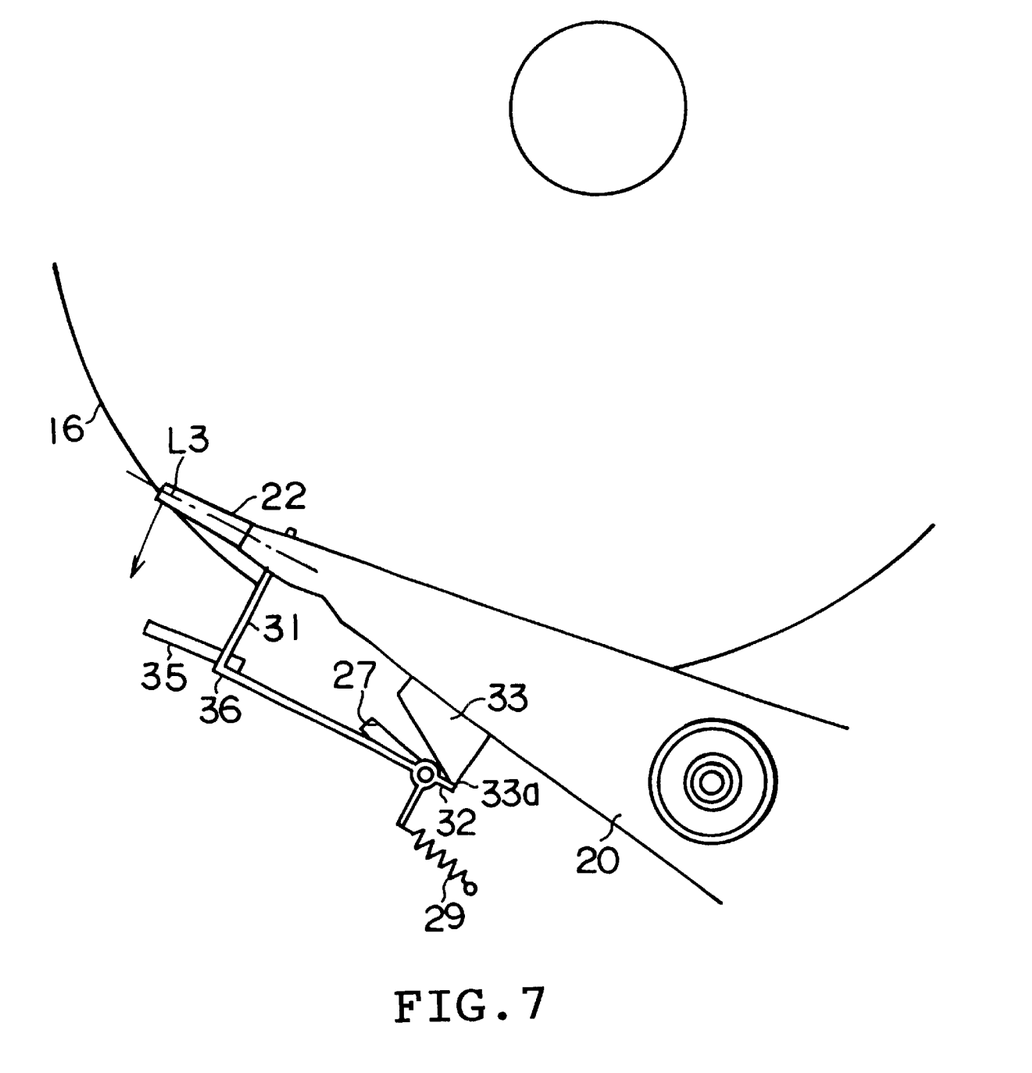
FIG. 7 is an enlarged plan view illustrating the lift bar at the operating position.

When the apex 33a of the cam 33 has reached the terminal edge of the cam receiving protrusion 32 as shown in FIG. 7, the lift bars 31 are positioned at the operating position defined between the disk surface of the magnetic disks 16 and the tip end of the carriage arms 20. The lift bars 31 at the operating position perpendicularly intersect the longitudinal central line L3 of the suspensions 22.

Figure 8:
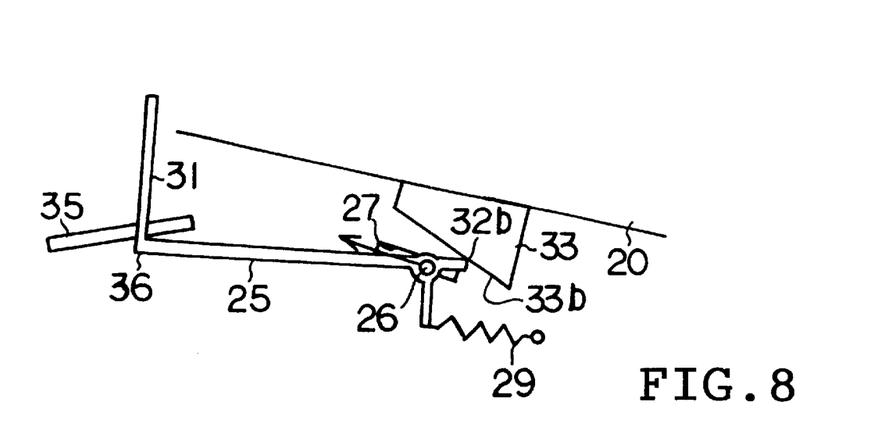
FIG. 8 is an enlarged plan view illustrating the cam contacting the cam receiving protrusion after the drive mechanism has been established.

When the carriage arm 20 further swings, the apex 33a of the cam 33 takes off the side surface 32a of the cam receiving protrusion 32. As a result, the apex 32b of the cam receiving protrusion 32 contacts the cam surface 33b of the cam 33 as shown in FIG. 8. The drive mechanism has been established for the cam 33 and cam receiving protrusion 32. The carriage arm 20 swings to allow the apex 32b of the cam receiving protrusion 32 to smoothly slide on the cam surface 33b of the cam 33. The drive force is accordingly generated to advance the pivot 26 along the guide groove 27 against the spring force from the spring 29. As the pivot 26 advances, the lift bars 31 is allowed to move in the forward direction toward the tip end of the suspensions 22.

Figure 9A:
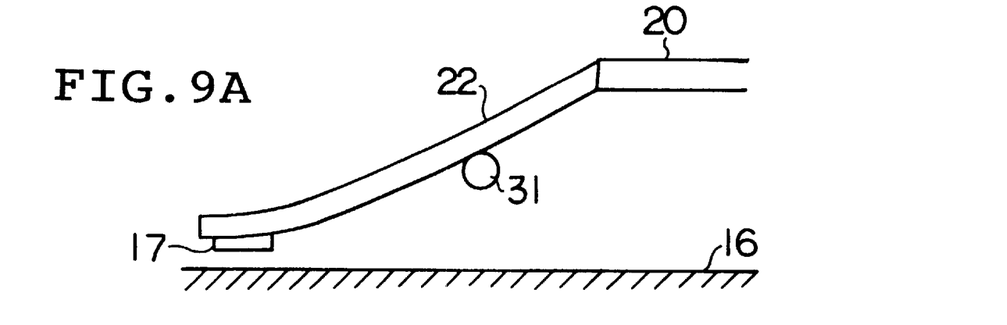
FIGS. 9A and 9B are enlarged side views illustrating the suspension when the lift bar contacting the suspension advances along the path.
Figure 9B:
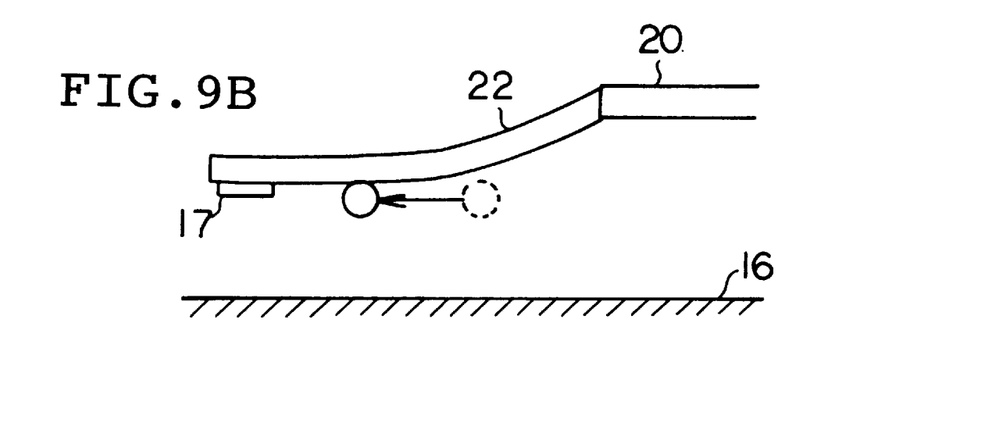

The lift bars 31 are adapted to contact the corresponding suspensions 22 as they advance along the path as shown in FIG. 9A. Additional advancement after the contact between the lift bars 31 and the corresponding suspensions 22 serves to cause the suspensions 22 to warp, as shown in FIG. 9B, thereby bringing the tip end of each suspension 22 away from the corresponding disk surface of the magnetic disk 16. The magnetic head 17 at the tip end of the suspension 22 is accordingly kept apart from the disk surface of the magnetic disk 16. Such warp in the suspension 22 keeps the magnetic head 17 at the tip end of the suspension 22 sufficiently above the disk surface irrespective of the termination of the rotation of the magnetic disk 16.

Figure 10:
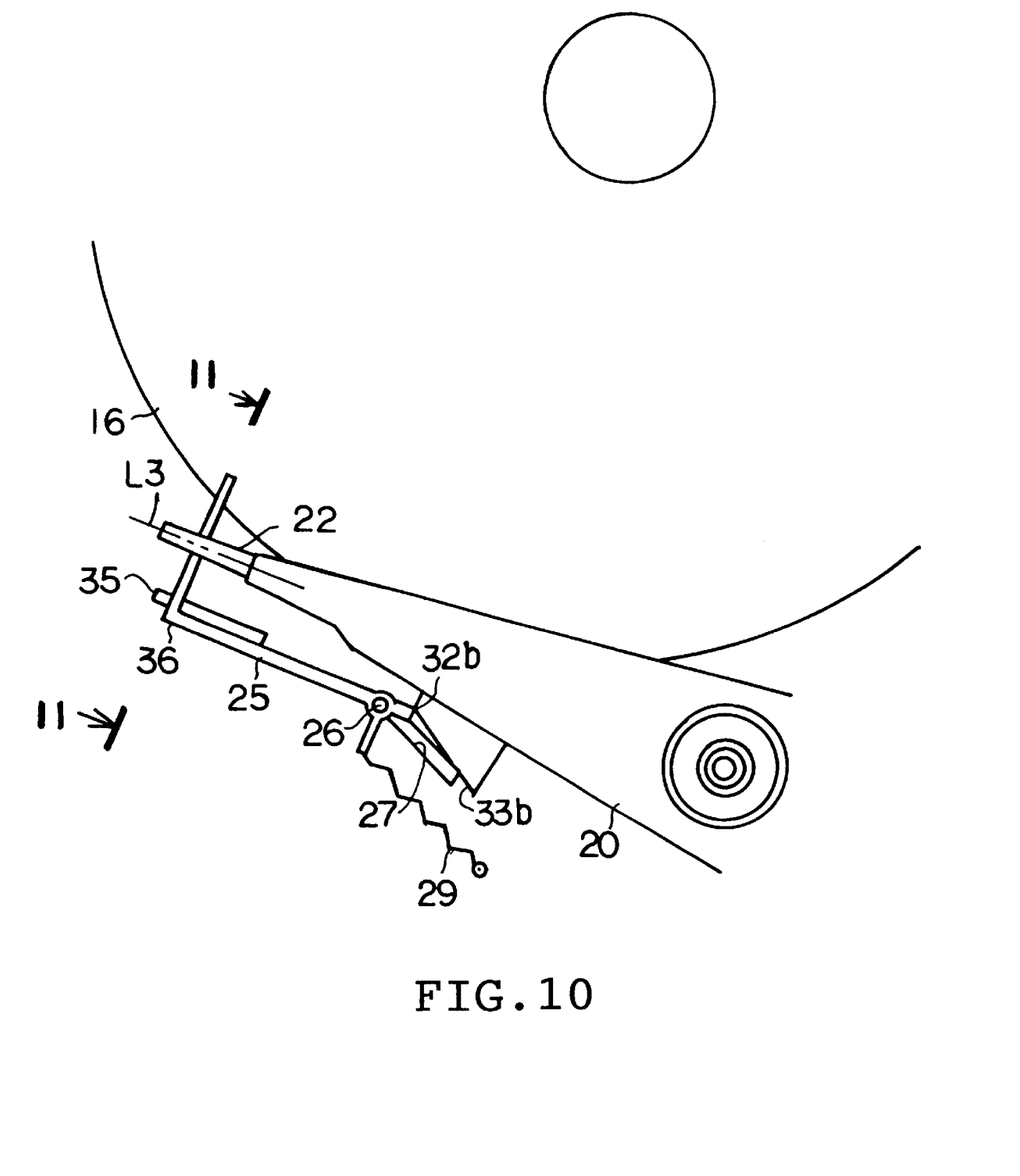
FIG. 10 is an enlarged plan view illustrating the suspension supported by the lift bar when the swinging movement of the carriage arm has been terminated.

When the lift bars 31 still advance contacting the suspensions 22, the warp gets larger in the suspensions 22. The guide member 36 keeps contacting the guide wall 35. Since a cross angle a has been established between the path of the pivot 26 in the first direction L1 and the path of the guide member 36 in the second direction L2, as shown in FIG. 3, the advancement of the pivot 26 in the first direction L1 causes the guide member 36 to move in the second direction L2, so that the support member 25 is allowed to swing around the pivot 26. This swinging movement of the support member 25 enables to keep the perpendicular relationship between the central line L3 of the suspensions 22 and the lift bars 31 irrespective of the change in the orientation of the suspensions 22 in response to the swinging movement of the carriage arm 20 as shown in FIG. 10.

Figure 11:
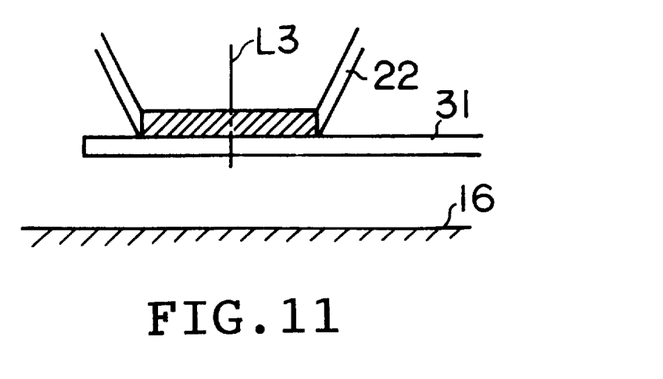
FIG. 11 is an enlarged sectional view taken along the line 11—11 in FIG. 10, illustrating the suspension.

As is apparent from FIG. 11, the suspension 22 is adapted to make a tilt in the forward direction along the central line L3. The suspension 22 keeps the constant distance to the disk surface along the direction perpendicular to the central line L3. Accordingly, as long as the lift bars 31 in parallel with the disk surfaces perpendicularly intersect the suspensions 22 in the direction perpendicular to the central line L3, the suspensions 22 possibly keep the constant distance from the disk surface along the direction perpendicular to the central line L3. As a result, no twist may be generated in the suspensions 22. Since such perpendicular relationship can be maintained between the central line L3 and the lift bars 31 with assistance of the effect of the orientation adjuster 34 even when the lift bars 31 advance, the suspensions 22 can be prevented from twisting all the time.

After the magnetic heads 17 have completely taken off the magnetic disks 16, the swinging movement of the carriage arm 20 is terminated. The lift bars 31 stop its advancement as shown in FIG. 10. The magnetic heads 17 are kept away from the disk surfaces by enough height above the level of the disk surfaces, avoiding twist in the suspensions 22. Even after the magnetic disks 16 have stopped rotating, the lift bars 31 keep the suspensions 22 away from the disk surfaces.

To the contrary, when the magnetic heads 17 are intended to write or read information data, the carriage arm 20 is operated to swing in the inward direction to bring the magnetic heads 17 toward the center of the magnetic disks 16 after the magnetic disks 17 have started rotating to generate enough air stream along the disk surface of the magnetic disks 16. The swinging movement of the carriage arm 20 serves to gradually release the drive force acting on the apex 32b of the cam receiving protrusion 32 from the cam surface 33b. The pivot 26 retracts in the guide groove 27 under the effect of the spring force from the spring 29. The lift bars 31 are then released from the support to the suspensions 22, however, the magnetic heads 17 keep flying above the disk surfaces with assistance of the air stream along the disk surfaces.

After the pivot 26 has been pulled back to the standard position in the guide groove 27, the further swinging movement of the carriage arm 20 serves to gradually release the drive force acting on the side surface 32a of the cam receiving protrusion 32 from the apex 33a of the cam 33. The support member 25 is allowed to swing about the pivot 26 under the effect of the spring force from the spring 29. As a result, the lift bars 31 returns to the standby position from the operating position.

It should be noted that the above-described suspension load mechanism 23 may be applied, not only to the hard disk drive unit (HDD) as described above, but also to any recording disk drive unit employing a so-called flying head.

What is claimed is:

1. A recording disk drive comprising:
   a recording disk having a disk surface;
   a carriage arm configured and arranged to swing about a support axis for moving said carriage arm in a radial direction of the recording disk;
   a suspension cantilevered on the carriage arm such that said suspension has a cantilevered end and a free end, wherein the free end is closer to the disk surface than the cantilevered end;
   a head supported at the free end of the suspension; and
   a lift bar disposed at a level between a level of the suspension and a level of the disk surface;
   a drive mechanism connected to the lift bar that moves the lift bar into contact with the suspension and keeps moving the lift bar after contact so as to cause a warp in the suspension, wherein said drive mechanism moves within a plane that is substantially parallel to the disk surface, said drive mechanism including a cam formed on the carriage arm, wherein said cam urges a support member in response to swinging movement of the carriage arm;
   the support member supporting the lift bar in parallel with the disk surface; and
   an orientation adjuster acting on a portion of the support member to change an orientation of the lift bar around a pivot within a plane parallel to the disk surface.

2. The recording disk drive according to claim 1, wherein said orientation adjuster comprises:
   a first guide passage extending in a first direction along a movement path of the lift bar;
   a slider that supports the pivot and is guided along the first guide passage;
   a second guide passage extending in a second direction intersecting the first direction; and
   a guide member formed on the support member so as to move along the second guide passage in response to movement of the slider along the first guide passage, thereby causing swinging movement of the support member around the pivot.

3. The recording disk drive according to claim 1, wherein said support axis of said carriage arm is substantially parallel to a central axis about which said recording disk is rotated.

4. The recording disk drive according to claim 1, further comprising a guide member that maintains a generally perpendicular relationship between the lift bar and a longitudinal axis of said suspension while the lift bar is being moved to cause a warp in said suspension.

5. The recording disk drive according to claim 1, further comprising a guide member that is configured and arranged to guide the lift bar along a generally straight line that is generally coincident with a longitudinal axis of the suspension.

6. A recording disk drive comprising:
   a recording disk having a disk surface;
   a carriage arm configured and arranged to swing about a support axis for moving said carriage arm in a radial direction of the recording disk;
   a suspension cantilevered on the carriage arm such that said suspension has a cantilevered end and a free end, wherein the free end is closer to the disk surface than the cantilevered end;
   a head supported at the free end of the suspension; and
   a lift bar disposed at a level between a level of the suspension and a level of the disk surface;
   a drive mechanism connected to the lift bar that moves the lift bar into contact with the suspension and keeps moving the lift bar after contact so as to cause a warp in the suspension;
   an insertion mechanism generating a force that moves the lift bar between a standby position defined outside the recording disk and an operating position defined between the suspension and the recording disk, wherein said insertion mechanism includes:
      a support member supporting the lift bar at its tip end, wherein said support member supports the lift bar in parallel with the disk surface;
      a pivot supporting the support member for swinging movement; and
      a cam formed on the carriage arm and contacting the support member so as to cause the swinging movement of the support member around the pivot in response to swinging movement of the carriage arm, wherein said cam urges the support member to cause advancement of the support member in response to the swinging movement of the carriage arm; and
   an orientation adjuster that acts on the support member to change an orientation of the lift bar around the pivot within a plane parallel to the disk surface.

7. The recording disk drive according to claim 6, wherein said orientation adjuster comprises:
   a first guide passage extending in a first direction along a movement path of the lift bar;
   a slider that supports the pivot and is guided along the first guide passage;
   a second guide passage extending in a second direction intersecting the first direction; and a guide member formed on the support member so as to move along the second guide passage in response to movement of the slider along the first guide passage, thereby causing swinging movement of the support member around the pivot.

8. The recording disk drive according to claim 6, wherein said support axis of said carriage arm is substantially parallel to a central axis about which said recording disk is rotated.

9. The recording disk drive according to claim 6, further comprising a guide member that maintains a generally perpendicular relationship between the lift bar and a longitudinal axis of said suspension while the lift bar is being moved to cause a warp in said suspension.

10. The recording disk drive according to claim 6, further comprising a guide member that is configured and arranged to guide the lift bar along a generally straight line that is generally coincident with a longitudinal axis of the suspension.

11. A recording disk drive comprising:
- a recording disk configured to be rotated about a central axis;
- a carriage arm configured and arranged to pivot about a support axis, wherein said support axis is substantially parallel to the central axis of the recording disk;
- a suspension cantilevered on the carriage arm to tilt in a forward direction toward a disk surface of the recording disk;
- a head supported at a free end of the suspension;
- a lift bar; and
- a means for moving said lift bar along a longitudinal axis of the suspension, wherein said means for moving said lift bar includes a support member that travels along a path that includes a linear portion as well as an arcuate portion.

12. A recording disk drive comprising:
- a recording disk;
- a suspension cantilevered on a carriage arm to tilt in a forward direction toward a disk surface of the recording disk;
- a head supported at a free end of the suspension, wherein a suspension direction is defined to extend between said free end and a cantilevered end of the suspension;
- a lift bar; and
- means for moving said lift bar in a straight line along a longitudinal axis of said suspension;
- wherein said means for moving said lift bar includes:
  - a means for pivoting a support member of said lift bar about a pivot point; and
  - a means for sliding said pivot point of said support member.

13. The recording disk drive according to claim 12, wherein said means for moving said lift bar causes said lift bar to travel along a path that includes at least one non-linear portion.

14. The recording disk drive according to claim 12, wherein said means for moving said lift bar moves said lift bar in parallel to a surface of the recording disk.

15. The recording disk drive according to claim 12, wherein:
- said means for sliding said pivot point includes a slider that is configured and arranged to slide within a guide groove; and
- said means for moving said lift bar includes a means for biasing said slider within said guide groove.

16. The recording disk drive according to claim 12, wherein said means for moving said lift bar includes a cam on the carriage arm for contacting a cam receiving protrusion on said support member, whereby when said cam contacts said cam receiving protrusion as said carriage arm is moved in the radially outward direction of the recording disk, said lift bar is brought into contact with said suspension.

17. The recording disk drive according to claim 12, wherein said means for moving said lift bar includes a guide member defined as a portion of the support member and a guide wall, whereby said guide member is configured to slide along said guide wall for helping to maintain the movement of said lift bar along the longitudinal axis of said suspension as said lift bar approaches the free end of the suspension.

* * * * *